US006664820B1

(12) United States Patent
Estrada

(10) Patent No.: US 6,664,820 B1
(45) Date of Patent: Dec. 16, 2003

(54) UNIVERSAL CABLE DRIVER BUFFER CIRCUIT

(75) Inventor: Julio Ricardo Estrada, South Portland, ME (US)

(73) Assignee: National Semiconductor Corporation, Santa Clara, CA (US)

( * ) Notice: Subject to any disclaimer, the term of this patent is extended or adjusted under 35 U.S.C. 154(b) by 31 days.

(21) Appl. No.: 10/047,512

(22) Filed: Oct. 22, 2001

(51) Int. Cl.$^7$ ................................................. H03K 3/00
(52) U.S. Cl. ...................................... 327/108; 330/258
(58) Field of Search ...................... 327/108–112, 563; 330/252, 253, 258

(56) References Cited

U.S. PATENT DOCUMENTS 5,216,380 A * 6/1993 Carbou ........................ 330/253

* cited by examiner

Primary Examiner—Kenneth B. Wells
(74) Attorney, Agent, or Firm—Wagner, Murabito & Hao LLP; Lawrence R. Goerke

(57) ABSTRACT

The present invention provides a novel method for a driving a cable and a cable driver circuit that are relatively insensitive to parasitic capacitance. The present invention provides a cable driver circuit and a method of driving a cable that is relatively insensitive to variations in load impedance. In one embodiment, a source-follower circuit with a complementary metal oxide semiconductor (CMOS) implementation effectuates a cable driver circuit, Which needs no operational amplifier for its functionality. In one embodiment, the cable driver circuit utilizes an internal precision voltage reference with a two-stage CMOS differential voltage amplifier, and a CMOS current mirror to generate a constant current source. The resulting constant current source delivers a signal compliant with the ITU-G703 specification, and which is stable and compliant over a wide range of load impedance values and associated capacitive milieus.

18 Claims, 4 Drawing Sheets

UNIVERSAL CABLE DRIVER BUFFER CIRCUIT

BACKGROUND OF THE INVENTION

1. Field of the Invention

The present invention relates to the field of electrical cable driver buffers. Specifically, the present invention relates to a circuit for effectuating a universal cable driver buffer that maintains a constant output voltage for a variety of cable termination electrical characteristics.

2. Related Art

Electronic communication media have become a ubiquitous and crucially important aspect of modern technology, commerce, industry, and leisure. Much modern electronic communications includes transmission of digital data. Some electronic communications media include cable-based modalities. One such cable-based communications modality effectuates electronic communications via coaxial cable. One coaxial cable standard for many communications applications has an impedance of 75 Ohms ($\Omega$).

Communications via coaxial cable routinely utilize devices to place electronic signals, including digital data, onto and to pick such signals off from a coaxial cable. One such group of such devices are transmitter-receivers, also known as transceivers. In the design of components, such as a clock recovery integrated circuit (IC), needed for such transceivers, the intent is to empower the transceiver as a unitary device to drive, e.g., to pass signals effectively onto, a 75$\Omega$ coaxial cable.

Drivers for coaxial cables employed in many communication applications are designed to comply with communications standards to assure interconnectivity among and between a plethora of communications networks and systems worldwide. One such standard with widespread adoption is ITU-G703, which is incorporated herein by reference. This standard is promulgated by the International Telecommunications Union (ITU) of Geneva, Switzerland. Standard ITU-G703 demands that compliant cable drivers impress a signal to be transmitted via a 75$\Omega$ coaxial cable with an amplitude of one Volt (1 V).

P-channel 13.5 mA constant current sources are a conventional cable driver mainstay. These devices employ operational amplifiers (Op Amps) to achieve the signal gain required to effectively drive a 1 V signal on a 75$\Omega$ coaxial cable. Referring to Conventional Art FIG. 1, one such op amp based cable driver is depicted. Such conventional cable drivers employ a bipolar implementation.

Their design approach incorporates complementary symmetry amplifiers. Such conventional drivers achieve an output voltage swing of twice the signal voltage specification. This is because compliance with telecommunications standards demands that, in order to properly terminate the communications cable, a termination resistor $R_{OT}$, equal in ohmic resistance value to a source impedance $Z_{OS}$, is connected in series with the line; the output voltage is accordingly divided between the two equal impedances, each dropping one half of the amplifier's output signal voltage. For the steady state conditions of the present discussion, an impedance $Z_{OC}$ of the coaxial cable itself is negligible.

Such conventional cable drivers are switchable, such that their output current may be delivered to either of two loads. As depicted in Conventional Art FIG. 1, the output current of a cable driver may be delivered from either an inverting or a non-inverting source output terminal to respective load resistors $R_{OT}$ or $R_{OT}'$ by parallel coaxial cable runs. Users of these drivers and the connected coaxial cables delivering the currents being driven by the drivers have the option of compliantly utilizing one or both of two differential signals with no penalty. In one option, a user elects to utilize one single-ended signal. In this case, to remain compliant with ITU-G703, the other available application must be terminated by an equivalent load resistance. In the present example, $R_{OT}$ and $R_{OT}'$ are compliantly equal in ohmic resistance values.

The preferable method of compliantly terminating the cables delivering the output of a conventional driver is to utilize two separate 75$\Omega$ resistors. In this case, the output signal may be taken from either resistor, switched between them, or taken from both and auctioneered, according to the preference of the user for a particular application. In any case, the 13.5 mA signal dropped across the 75$\Omega$ resistor develops the 1 V output signal, in compliance with ITU-G703.

However, in using a constant current source to generate a signal with a 1 V amplitude, a problem arises with respect to parasitic capacitance. Parasitic capacitances arise at the output of the driver from a number of sources. Sources of parasitic capacitance there include (1) the capacitance of printed circuit boards used in the construction of both the drivers and the load; (2) routing capacitances arising from the layout of conductors carrying the signal, within the driver, the cable capacitance of coaxial cable itself, and within the load; (3) the capacitance arising between the bonding pads to which the load resistors are soldered or otherwise electrically coupled and mechanically mounted and the dielectric material constituting the material from which the load printed circuit boards are constructed; and (4) capacitance associated with all conductive copper, aluminum and/or metallic traces.

A charge-discharge loop is associated with the parasitic capacitances. The parasitic capacitance charges and discharges cyclically in accordance with the output signal. The charge-discharge cycle of the parasitic capacitance is deleterious for a number of reasons. One detrimental effect is that, with signals on the order of the amplitude under discussion herein, a non-negligible amount of current intended to be passed in the load is diverted to supplying the charging current.

Another effect of parasitic capacitance is adverse to the signal risetime and correspondingly degrades bandwidth and data transfer rate and capacity. Absent parasitic capacitance, the risetime is wholly dependent upon the signal itself, and follows from the device generating the signal. Parasitic capacitance however, in association with the load impedance, develops a charge-discharge time constant proportional to the capacitance, which adds delay to the signal risetime. In as much as bandwidth is inversely proportional to the signal risetime, the delayed signal risetime reduces bandwidth and the rate and capacity of data signal transmission accordingly.

The degradation of signal risetime due to parasitic capacitance is illustrated by reference to Conventional Art FIG. 2. In a first exemplary circuit with an associated parasitic capacitance of five pico Faradays (pF) has a corresponding signal risetime of just over 1 nanosecond (nS). A second exemplary circuit passes the identical 1 V amplitude signal as the first circuit. However, the second circuit has an associated parasitic capacitance of ten pF. It is seen that the signal risetime associated with the second circuit is twice that of the first circuit, between 2 and 3 nS.

In an effort to counter these detrimental effects, efforts must be taken to minimize parasitic capacitance. For instance, extreme care must be taken in the design layout of printed circuit boards used in drivers and loads and quality control of both materials selected for them and their construction. Also, extreme care is needed in the placement of load resistors and the routing and connection of cable. Further, connection of the cables, usually by BNC type connectors, adds to parasitic capacitance, each BNC connector adding a degree of capacitance and exacerbating the problem.

However, efforts at minimizing parasitic capacitance may be cumbersome and pose an undue burden on users and makers of cable drivers. Efforts such as exercise of care in printed circuit board layout and quality control are burdensome and expensive. Further, they may not effectuate all applications and in others may not suffice.

A further problem arises, which may be characterized as sensitivity to variations in load resistance inherent in conventional constant current drivers. With a constant 13.5 mA output current producing a 1 V peak-to-peak signal amplitude in compliance with ITU-G703, the load impedance is limited by Ohm's Law to 75Ω. Any variation in load impedance, such as temperature-related resistance divergences will produce signal errors or departure from compliant tolerances.

Further, circuit designs become constrained by the load impedance strictures, preventing implementation of circuits with anything but precision 75Ω load resistors. In some applications, this may deliver other than an optimal circuit design. Other applications may be precluded by the inflexibility of the load impedance stricture. Still others may be quite functional, yet suffer degraded performance due to factors causing variations in load impedance.

What is needed is a cable driver circuit and/or a method of driving a cable that is relatively insensitive to parasitic capacitance. What is also needed is a cable driver circuit and/or a method of driving a cable that is relatively insensitive to variations in load impedance. Further, what is needed is a cable driver circuit and/or a method of driving a cable that is able to source as much current as is demanded by a load having a relatively wide range of impedance values and any parasitic capacitances associated with the cable, the routing of the signal, and the connections at both cable ends, while maintaining a 1 V peak-to-peak signal amplitude, in compliance with ITU-G703.

SUMMARY OF THE INVENTION

The present invention provides a novel method for a driving a cable and a cable driver circuit that are relatively insensitive to parasitic capacitance. The present invention provides a cable driver circuit and a method of driving a cable that is relatively insensitive to variations in load impedance. Further, the present invention provides a cable driver circuit and a method of driving a cable that is able to source as much current as is demanded by a load, which may have a relatively wide range of impedance values and parasitic capacitances associated with the cable, the routing of the signal, and the connections at both cable ends, while maintaining a 1 V peak-to-peak signal amplitude, in compliance with the ITU-G703 specification.

In one embodiment, a source-follower circuit with a complementary metal oxide semiconductor (CMOS) implementation effectuates a cable driver circuit, which needs no operational amplifier for its functionality. In one embodiment, the cable driver circuit utilizes an internal precision voltage reference with a two-stage CMOS differential voltage amplifier, and a CMOS current mirror to generate a constant current source. The resulting constant current source delivers a signal compliant with the ITU-G703 specification, and which is stable and compliant over a wide range of load impedance values and associated capacitive milieus.

These and other advantages of the present invention will become obvious to those of ordinary skill in the art after reading the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Conventional Art

Conventional Art

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical signals capable of being stored, transferred, combined, compared, and otherwise manipulated in an electronic system.

The present invention is discussed primarily in the context of a circuit and an apparatus for effectuating a universal cable buffer driver. The present invention also provides a method for driving a signal on a cable. In one embodiment, the present invention provides a novel method for a driving a cable and a cable driver circuit that are relatively insensitive to parasitic capacitance. In another embodiment, the present invention provides a cable driver circuit and a method of driving a cable that is relatively insensitive to variations in load impedance. In a further embodiment, the present invention provides a cable driver circuit and a method of driving a cable that is able to source as much current as is demanded by a load, which may have a relatively wide range of impedance values and parasitic capacitances associated with the cable, the routing of the signal, and the connections at both cable ends, while maintaining a 1 V peak-to-peak signal amplitude, in compliance with the ITU-G703 specification.

Exemplary Universal Cable Buffered Driver
Exemplary Circuit Overview

Figure 3:
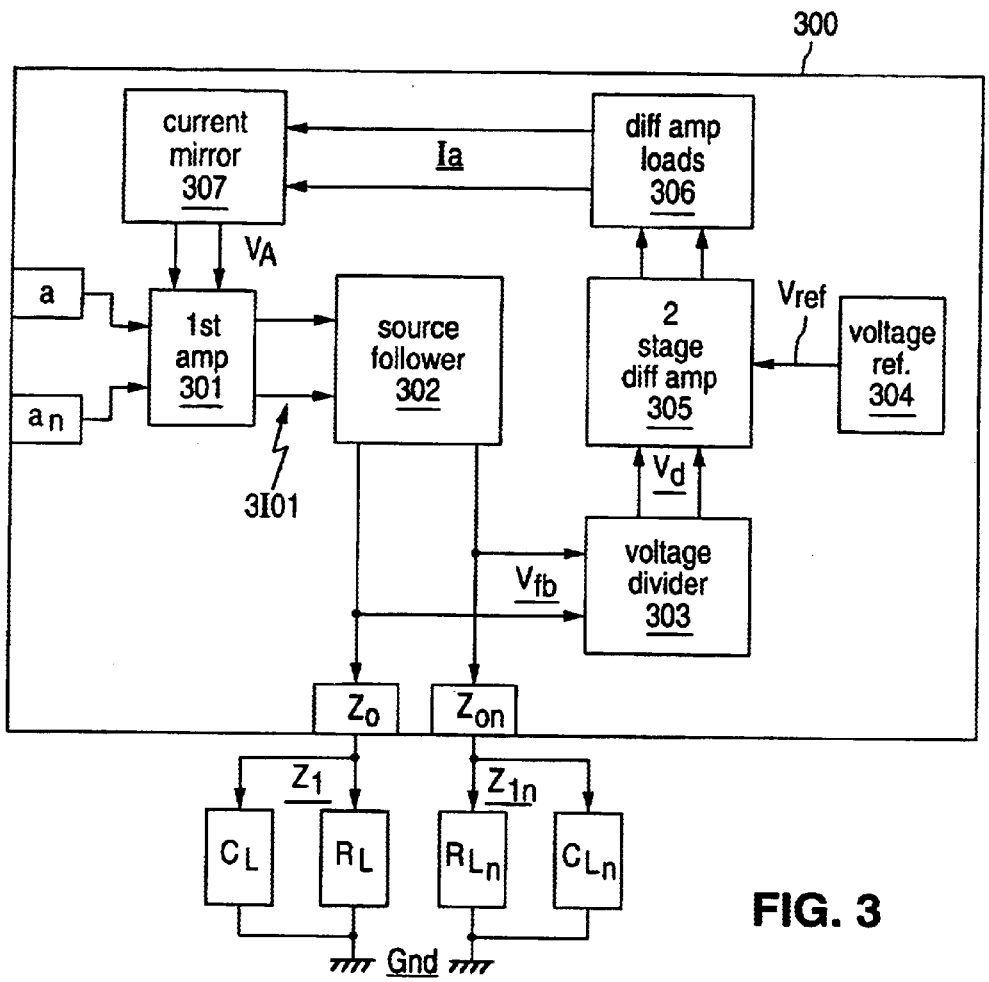
FIG. 3 is a block diagram of a universal cable driver buffer circuit, in accordance with one embodiment of the present invention.

With reference to FIG. 3, an exemplary cable buffer driver circuit 300 is depicted, in accordance with one embodiment of the present invention. Cable driver buffer circuit 300 receives two inputs, a and $a_n$. Inputs a and $a_n$ constitute signals to be transmitted to loads Z and Zn, respectively, by cable buffer driver circuit 300.

Inputs a and $a_n$ are impressed upon a first amplifier 301. In one embodiment, first amplifier 301 is a differential amplifier (Diff Amp). In one embodiment, differential amplifier 301 is implemented using a pair of complementary metallic oxide semiconductor (CMOS) transistors. The output of first amplifier 301 forms a first intermediate output 3IO1.

The first intermediate output generated by amplifier 301 is coupled through a low source impedance source follower amplifier stage 302 to a voltage divider 303. Source follower amplifier stage 302 further amplifies intermediate output 3IO1. While the voltage of source follower 302 is attenuated, e.g., less than unity, its current gain is substantial.

Figure 4:
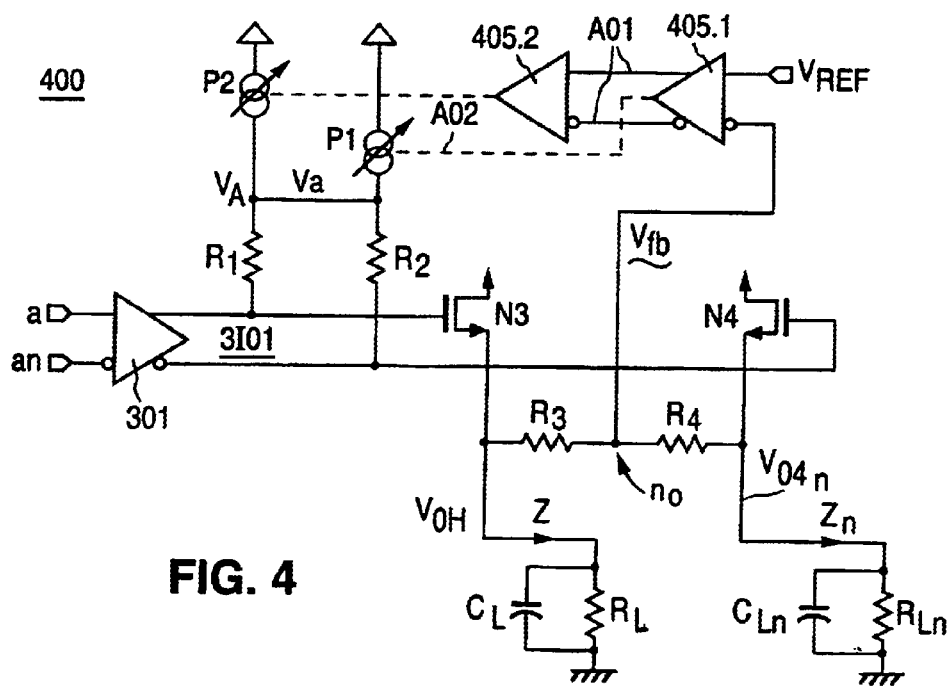
FIG. 4 is a functional diagram of a universal cable driver buffer circuit, in accordance with one embodiment of the present invention.
Figure 5:
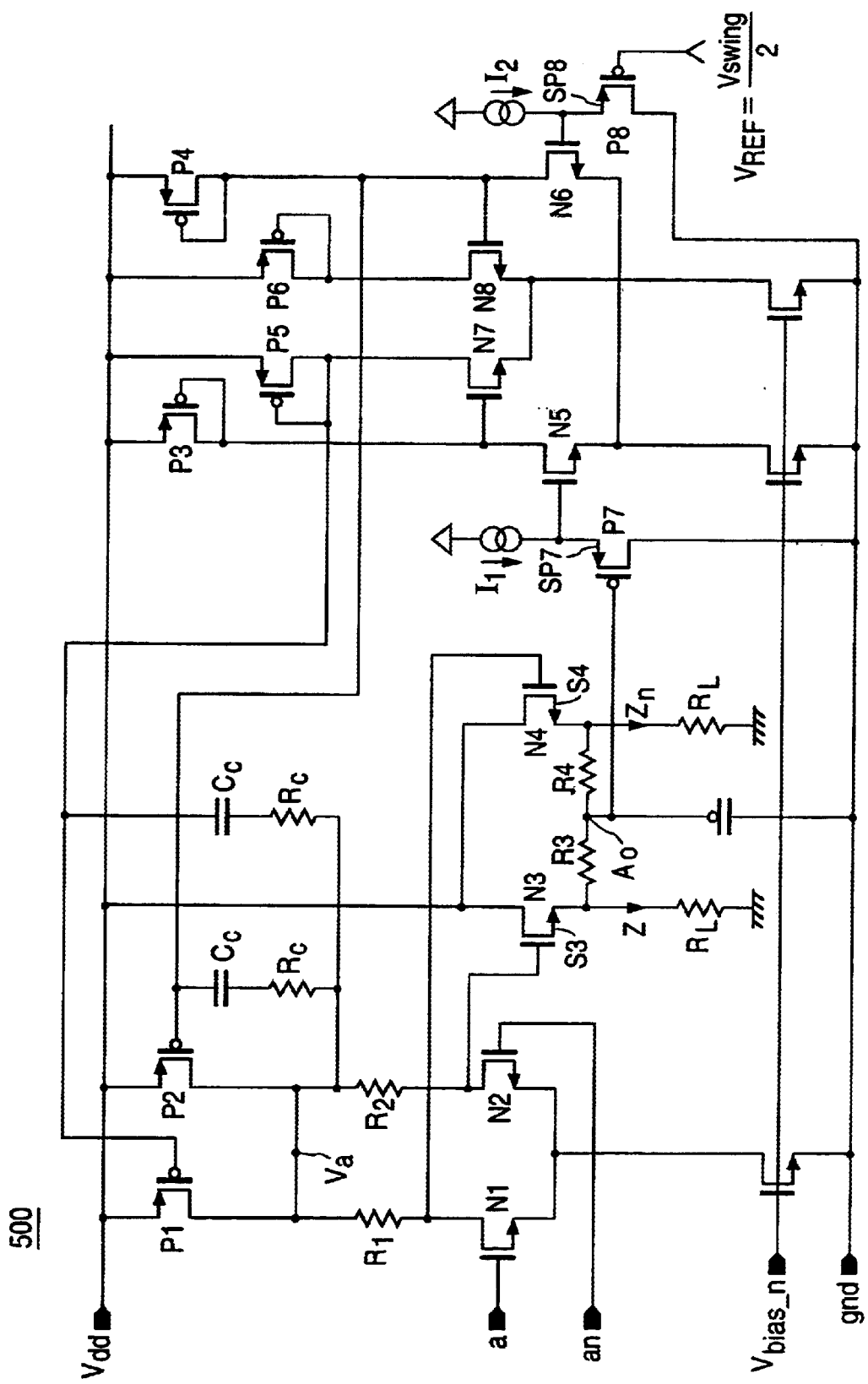
FIG. 5 is a schematic diagram of a universal cable driver buffer circuit, in accordance with one embodiment of the present invention.

Voltage divider 303 divides the voltage between outputs Z and Zn, sensed at the sources of transistors (e.g., transistors N3 and N4; FIGS. 4, 5) comprising low source impedance source follower amplifier stage 302. In one embodiment, voltage divider 303 is constituted by a pair of precision resistors (e.g., resistors R3, R4; FIGS. 4, 5), each of an equivalent ohmic resistance value. The voltage divided by voltage divider 303 effectuates a feedback voltage Vfb equivalent to half of the voltage between outputs Z and Zn.

Voltage divider 303 is coupled to a third amplifier 305. In one embodiment, third amplifier 305 is a differential amplifier. In one embodiment, differential amplifier 305 is a two-stage differential amplifier 305. Thus, feedback voltage Vfb is sensed at one input of two-stage differential amplifier 305. Two-stage differential amplifier 305 also receives a second input. The second input is a reference voltage signal Vref. In one embodiment, reference voltage signal Vref is generated by an internal precision voltage reference generator 304. In one embodiment, reference voltage signal Vref is equal in amplitude to one half of the designed maximum output voltage swing.

The two-stage differential amplifier 305 amplifies the difference voltage between feedback voltage Vfb and Vref. Two-stage differential amplifier 305 initially amplifies the difference voltage between feedback voltage Vfb and Vref in a first stage. The gain of two-stage differential amplifier 305 is magnified by a second stage of amplification. Two-stage differential amplifier 305 is coupled to differential amplifier loads 306. The resulting output of each stage of two-stage differential amplifier 305 drives a respective loading component of differential amplifier loads 306, which are coupled to current mirror 307.

The corresponding output current Ia from differential amplifier loads 306 is multiplied by current mirror 307, and coupled through outputs Zo and Zon to drive loads Zl and Zln respectively. Loads Zl and Zln are constituted by a cable impedance Zc and Zcn, which are effectively negligible under steady-state conditions, in series with parallel resistive-capacitive (RC) networks formed by resistor RL and capacitor CL, and resistor RLn and capacitor CLn, respectively. The opposite end of the loads Zl and Zln are at grounds Gnd. Capacitors CL and CLn constitute parasitic capacitances. Load resistors RL and Rln may have a wide range of ohmic resistance values, on the order of 20–150Ω.

While 75Ω resistors, nominal in most conventional applications compliant with specification ITU-G703, may be utilized with embodiments of the present invention, any load resistance on the order of 20 to 150Ω may also be utilized with embodiments of the present invention. The output signal of cable driver buffer 300 remains compliant with the specification. Thus, the present invention advantageously enables applications encompassing a wider range of output impedances than in the conventional art. Further, output signals from cable buffer driver 300 advantageously remain compliant with ITU-G703 despite variations in load resistance due to environmental factors such as temperature fluctuation and corresponding physical characteristics of the load resistors such as, in the present example, temperature coefficient of resistivity. Further still, output signals from cable buffer driver 300 advantageously remain compliant with ITU-G703 despite parasitic capacitances over a wide capacitance range.

Exemplary Circuit Function

With reference to FIG. 4, the functioning of an exemplary universal cable driver buffer circuit 400 is explained. Inputs a and $a_n$ are impressed upon a first amplifier 301. In one embodiment, first amplifier 301 is a differential amplifier (Diff Amp). In one embodiment, differential amplifier 301 is implemented using a pair of complementary metallic oxide semiconductor (CMOS) transistors. The output of first amplifier 301 forms a first intermediate output 3IO1.

First intermediate output 3IO1 is coupled to a pair of transistors N3 and N4. In one embodiment, transistors N3 and N4 are implemented as N-channel CMOS devices. Effectively, transistors N3 and N4 function together as a very low impedance source follower amplifier (e.g., low impedance source follower amplifier 302; FIG. 3), further amplifying first intermediate output 3IO1 and coupling it, as further amplified, to a pair of resistors R3 and R4.

In one embodiment, resistors R3 and R4 are precision resistors having equal ohmic resistance values. Resistors R3 and R4 effectively function together as a voltage divider (e.g., voltage divider 303; FIG. 3). The voltage is sensed at a node $n_o$ between resistors R3 and R4. The voltage sensed at node $n_o$ becomes a feedback voltage Vfb.

Feedback voltage Vfb is a first input for an amplifier 405.1. A reference voltage Vref is a second input to amplifier 405.1. In one embodiment, reference voltage Vref is generated internally by a voltage reference generator (e.g., voltage reference generator 304; FIG. 3).

In one embodiment, amplifier 405.1 is a differential amplifier. In one embodiment, differential amplifier 405.1 is implemented using a pair of N-channel CMOS transistors. Differential amplifier 405.1 amplifies the difference between feedback voltage Vfb and reference voltage Vref and generates a corresponding output AO1.

Output AO1 is coupled to an amplifier 405.2. In one embodiment, amplifier 405.2 is also a differential amplifier.

In one embodiment, differential amplifier 405.2 is also implemented using a pair of N-channel CMOS transistors. Differential amplifier 405.2 amplifies output AO1 from differential amplifier 405.1. Effectively, differential amplifier 405.2 further amplifies the difference between feedback voltage Vfb and reference voltage Vref. Thus, differential amplifier 405.2 effectively increases the gain of differential amplifier 405.1.

Figure 1:
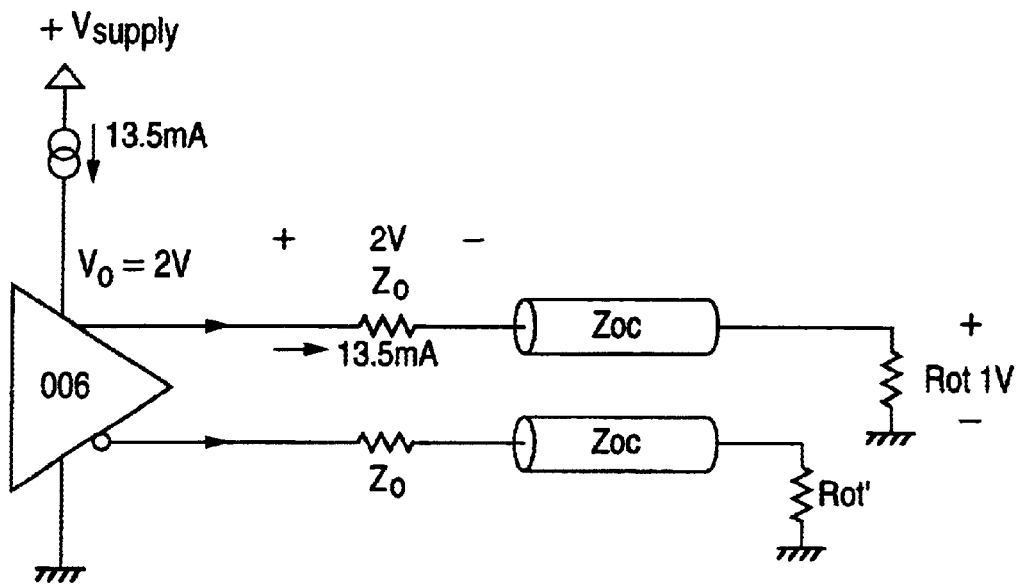
FIG. 1 is a schematic diagram of a conventional cable driver output circuit.
Figure 2:
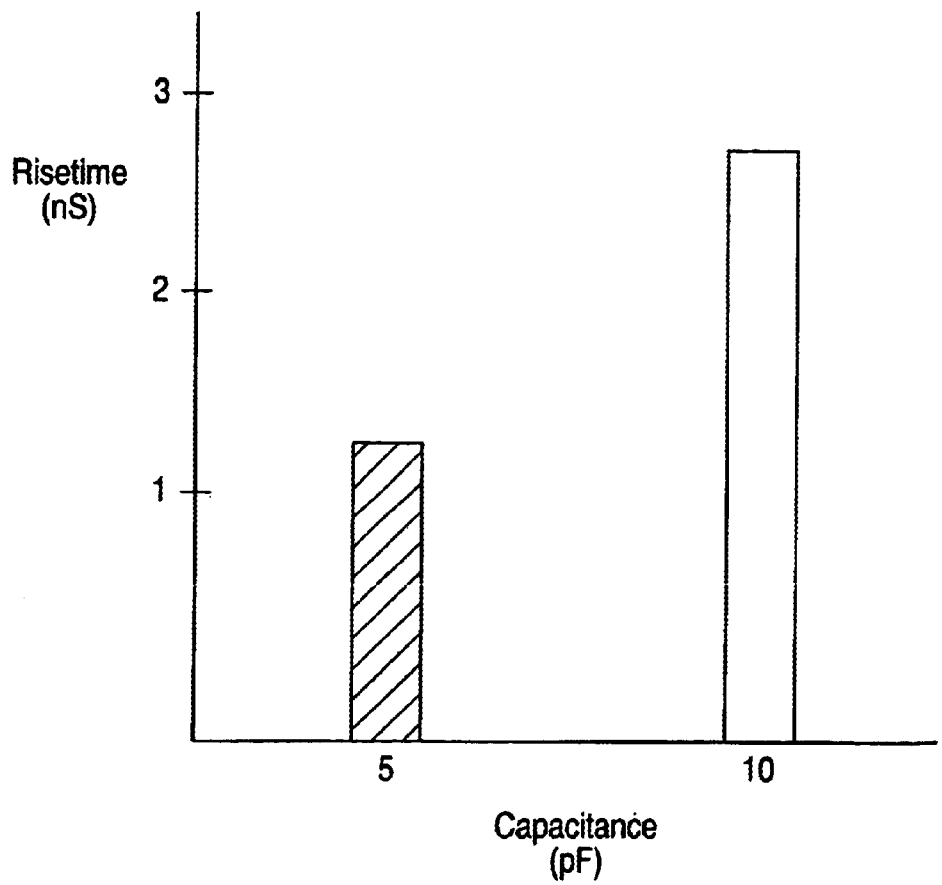
FIG. 2 is a bar graph of relative signal risetimes of circuits having two different capacitances.

Advantageously, using differential amplifiers to implement amplifiers 405.1 and 405.2, and using both amplifiers 405.1 and 405.2 as a two-stage differential amplifier provides sufficient voltage gain to obviate the conventional requirement of operational amplifiers (e.g.,. op amp 006; Conventional Art FIG. 1). This is further advantageous because differential amplifiers, used in this particular application, are inherently more stable than operational amplifiers.

Effectively therefore, differential amplifiers 405.1 and 405.2 function together as distinct stages of a two-stage differential amplifier (e.g., 2-stage differential amplifier 305; FIG. 3). The outputs of the differential amplifier 405.1 and differential amplifier 405.2 essentially function together as a controlling input AO2 to control a pair of current mirrors P1 and P2. In one embodiment, controlling input AO2 is generated via differential amplifier loads (e.g., differential amplifier loads 306; FIG. 3).

In one embodiment, current mirror P1 and current mirror P2 function together as amplifiers. In one embodiment, current mirrors P1 and P2 are implemented using one P-channel CMOS transistor, each.

Current mirrors P1 and P2 respectively couple to the output of amplifier 301 through resistors R1 and R2. A voltage $V_A$ is developed at a node va between resistors R1 and R2. The functionality of this arrangement to driving the output signal, e.g., an output voltage $V_{OH}$ (and $V_{OH}n$) of universal cable driver buffer 400 is discussed in detail below (FIG. 5). The stability of voltage $V_A$ is critical to promoting a quiet output, e.g., an output with a low oscillatory probability.

Exemplary Universal Cable Driver Buffer Circuit

Referring to FIG. 5, an exemplary universal cable driver buffer circuit 500 is described in accordance with one embodiment of the present invention. Two data inputs a and $a_n$ place an input signal into universal cable driver buffer circuit 500. Signals a and $a_n$ are, in one embodiment, differentiable from one another. However, by alternative biasing in another embodiment, universal cable driver buffer circuit 500 may have a single ended input. In the present embodiment, inputs a and $a_n$ may be inverting or non-inverting inputs, depending on which of the two inputs the input data signal will be applied.

Inputs a and $a_n$ are coupled respectively to a pair of transistors N1 and N2. In one embodiment, transistors N1 and N2 are N-channel CMOS implementations. In one embodiment, transistors N1 and N2 form a differential pair whose load resistors are resistors R1 and R2. The differential pair N1 and N2 form a first differential amplifier (e.g., first amplifier 301; FIG. 3), which amplifies the difference between the signals appearing at the inputs a and $a_n$ and generates a corresponding first amplifier output (e.g., first amplifier output 3IO1; FIG. 3).

The first amplifier output is coupled to a second pair of transistors N3 and N4. In one embodiment, transistors N3 and N4 are also N-channel CMOS implementations. Transistors N3 and N4 function together as a second amplifier. Together with resistors R3 and R4, respectively, transistors N3 and N4 function as very low impedance source followers. Effectively, a buffer implementation is achieved with an input differential amplifier formed by transistors N1 and N2, wherein the output of the differential amplifier is the source follower N3 and N4.

Source followers N3 and N4 effectively source whatever requisite current is demanded by the load resistors RL and RLn to form an output signal with an amplitude $V_{OH}$ between the sources s3 and s4, respectively, of transistors N3 and N4. Thus, resistors R3 and R4, together, function as a voltage divider. This voltage divider is a foundational part of a voltage sensing functionality. Resistors R3 and R4, in one embodiment, are precession resistors of equivalent ohmic resistance value. Each of resistors R3 and R4 thus drops half of the voltage differential of the output signal, e.g., the difference in voltage between sources s3 and s4, respectively, of transistors N3 and N4. Thus, at a node $n_o$ formed between resistors R3 and R4, the voltage is equal to one half of the voltage differential between sources s3 and s4, respectively, of transistors N3 and N4.

A reference voltage Vref, generated internally, in one embodiment, by a voltage reference generator (e.g., voltage reference generator 304; FIG. 3) is nominally equal to the maximum output voltage swing, e.g., between resistors R3 and R4, the voltage is equal to one half of the voltage differential between sources s3 and s4, respectively, of transistors N3 and N4. Thus, the reference voltage Vref is nominally equal to the voltage at node $n_o$ formed between resistors R3 and R4. The voltage at node $n_o$ formed between resistors R3 and R4 is a feedback voltage Vfb. Referenced to ground potential, these voltage levels $V_{OH}$, Vfb, and Vref have amplitudes on the order of from zero to one Volt (0–1 V).

These relatively low amplitude voltage signals Vfb and Vref are each level shifted in the upward direction by source follower transistors P7 and P8, respectively. In one embodiment, source follower transistors P7 and P8 are a P-channel CMOS implementation. Source follower transistors P7 and P8 are driven respectively by currents I1 and I2. Respectively amplifying the voltages Vfb and Vref, source follower transistors P7 and P8 couple these signals to the gates of transistors N5 and N6, respectively. Transistors P7 and P8 are a P-channel CMOS implementation; thus their output is taken at their respective sources sP7 and sP8, respectively; e.g., at a higher voltage level than at the gate.

The feedback voltage signal Vfb, thus level-shifted, is applied at the input of the first stage of a differential amplifier (e.g., two-stage differential amplifier 305; FIG. 3). In one embodiment, the first stage of the differential amplifier is implemented by a pair of N-channel CMOS transistors N5 an N6. In the present embodiment, transistors N5 and N6 respectively utilize P-channel CMOS transistors P3 and P4 as loads. Loading transistors P3 and P4 are coupled to current mirror transistors P1 and P2, respectively. In the present embodiment, transistors P3, P4, P1 and P2 are a P-channel implementation. Transistors N7 and N8 (e.g., the differential amplifier second stage) respectively utilize P-channel CMOS transistors P5 and P6, respectively, as loading transistors.

The transistor P1, partial constituting the current mirror (e.g., current mirror 307; FIG. 3) is coupled to differential amplifier first stage loading transistors P3 and P4, respectively. Current mirror transistor P1 mirrors differential amplifier loading transistor P4; e.g., differential amplifier loading transistor P4 controls the output of current mirror transistor P1. Thus, the differential amplifier first stage transistors N5 and N6 effectively control, via their loading transistors P3 and P4 and correspondingly current mirror transistor P1, the high side of the load resistors R1 and R2. The circuit as described is partially functional with only a single functional, e.g., first, differential amplifier stage. However, the voltage gain with only a single functional differential amplifier stage is insufficient for ready application, because, for one reason, excessive ringing might be noticeable on the output signal.

Additional gain for the feedback voltage is achieved, in one embodiment, without the conventional requirement of applying an operational amplifier (Op Amp). In the present embodiment, the additional voltage gain necessary to prevent excessive signal ringing is achieved by application herein of a second differential amplifier stage. The conventional solution of bringing an Op Amp to bear in this application is problematic because of inherent stability inferiority. In one embodiment of the present invention, however, this drawback is overcome. Utilizing a second differential amplifier stage to effectuate the required gain achieves voltage gains comparable with Op Amps applied in the conventional art, but without their inherent inferior loop stabilities.

The additional requisite gain is achieved in one embodiment of the present invention by a second differential amplifier stage, effectuated by a pair of transistors N7 and N8. In one embodiment, second differential amplifier stage transistors N7 and N8 are an N-channel CMOS implementation.

The second differential amplifier stage effectuated by transistors N7 and N8 are loaded by loading transistors P5 and P6, respectively. Transistor P2 partially constituting the current mirror are coupled to differential amplifier second stage loading transistors P5 and P6. Current mirror transistor P2 mirrors differential amplifier loading transistor P5; e.g., differential amplifier loading transistor P5 controls the output of current mirror transistor P2. Thus, the differential amplifier second stage transistors N7 and N8 also effectively control, via their loading transistors P5 and P6 and correspondingly current mirror transistor P2, the high side of the load resistors R1 and R2.

The current mirror formed by the functionality of transistors P1 and P2 drives the loading of the input differential amplifier (e.g., first differential amplifier 301; FIG. 3) transistors N1 and N2, because the common node point $n_o$ between resistors R1 and R2 determines the voltage $V_{OH}$ at the output. When either of the transistors N1 and N2, constituting the input differential amplifier (e.g., first differential amplifier 301; FIG. 3) are in cut-off, the voltage drop across resistors R1 or R2 is zero. Thus, the output voltage $V_{OH}$ is exclusively determined from the voltage appearing at the common node Va between resistors R1 and R2, e.g., the point at which the respective drains of transistors P1 and P2, constituting the current mirror, are fed.

In the present embodiment, the output voltage $V_{OH}$ is equivalent to the voltage difference between Va and the gate-to-source voltage drop of either of transistors N3 or N4; e.g., $$V_{OH} = V_a - V_{GS}.$$

In as much as $V_{OH}$, in the present embodiment, is ideally one Volt (1 V), in compliance with specification ITU-G703, and the gate-to-source voltage drop is nominally 1 V, VA is 2 V. Thus, the stability of the voltage expressed at node Va, between resistors R1 and R2, is critical. The best solution to the problem of achieving a quiet, low oscillatory circuit, e.g., a circuit expressing a very low oscillation probability on node Va, is the application of relatively low gain circuits herein.

In one embodiment of the present invention, compensation for the relatively low gain circuits used is achieved by the method in which the current mirror transistors are connected. In the present embodiment, the current mirror essentially acts as a voltage amplifier. Thus, the voltage at node Va is very steady, and correspondingly, the output signal $V_{OH}$ is remarkably stable.

Exemplary Method

Figure 6:
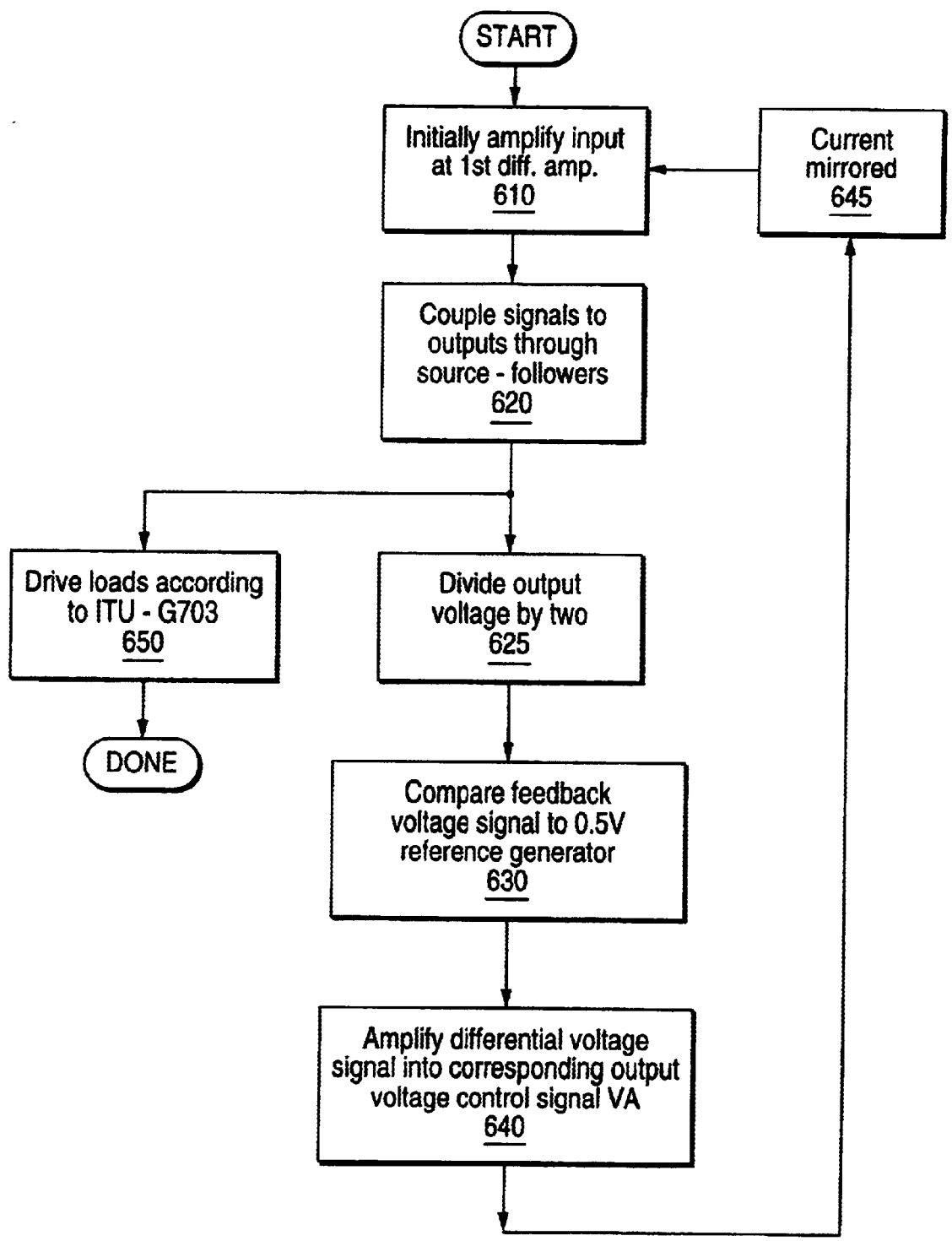
FIG. 6 is a flowchart of the steps in a process for driving a cable signal, in accordance with one embodiment of the present invention.

With reference to FIG. 6, the steps in an exemplary process 600 for driving a signal of a constant amplitude, without sensitivity to parasitic capacitance and variation in load impedance, on a cable are explained. Process 600 begins with step 610, wherein an input is amplified into a first intermediate signal.

Such amplification may, in one embodiment, be effectuated by a first differential amplifier (e.g., first differential amplifier 301; FIG. 3). Subsequent additional initial amplification may be provided, in one embodiment. This may be effectuated by a source follower amplifier (e.g., source follower amplifier 302; FIG. 3).

In step 620, the first intermediate signal is coupled through to outputs via source-followers (e.g., source follower 302; FIG. 3).

Further, in step 625, the output is sampled for feedback, wherein the voltage corresponding to the first intermediate signal is divided. Step 625 may be effectuated, in one embodiment, by a voltage divider (e.g., voltage divider 303; FIG. 3).

The voltage corresponding to the first intermediate signal is compared, in step 630, to a reference voltage (e.g., reference voltage Vref; FIG. 3). The voltage corresponding to the first intermediate signal may, in one embodiment, constitute a feedback voltage signal (e.g., voltage feedback signal Vfb; FIG. 4). The difference between the feedback voltage signal and the reference voltage signal forms a differential voltage.

The differential voltage may be amplified, in step 640, into a voltage control signal (e.g., voltage control signal Va; FIG. 5). Amplification may be achieved, in one embodiment, by a differential amplifier, which may be a multi-stage differential amplifier (e.g., two-stage differential amplifier 305; FIG. 3).

A driving current may be generated corresponding to the amplified feedback voltage/reference voltage differential voltage. This may be accomplished, in one embodiment, by a multi-stage sub-circuit constituted by a first differential amplifier loading stage (e.g., differential amplifier loads 306; FIG. 3) and a current mirror (e.g., current mirror 307; FIG. 3) controlled by the differential amplifier loading stage, e.g., as explained above in the discussion of FIG. 5. Thus, the output of the differential amplifiers is current mirrored, such as by a current mirror (e.g., by current mirror 307; FIG. 3); step 645.

The output of the current mirror is looped back to the initial amplifier stage, repeating step 610. Thus, the loads are driven in accordance with specification ITU-G703, directly from the output of the source followers; step 650. An output signal with a voltage amplitude corresponding to the current mirror driving current is driven accordingly; step 650. Process 600 is complete at this point.

In summary, the present invention provides a novel method for a driving a signal on a cable and a cable driver circuit that are relatively insensitive to parasitic capacitance. The present invention provides a cable driver circuit and a method of driving a cable that is relatively insensitive to variations in load impedance. Further, the present invention provides a cable driver circuit and a method of driving a cable that is able to source as much current as is demanded by a load, which may have a relatively wide range of impedance values and parasitic capacitances associated with the cable, the routing of the signal, and the connections at both cable ends, while maintaining a 1 V peak-to-peak signal amplitude, in compliance with the ITU-G703 specification.

In one embodiment, a source-follower circuit with a complementary metal oxide semiconductor (CMOS) implementation effectuates a cable driver circuit, which needs no operational amplifier for its functionality. In one embodiment, the cable driver circuit utilizes an internal precision voltage reference with a two-stage CMOS differential voltage amplifier, and a CMOS current mirror to generate a constant current source. The resulting constant current source delivers a signal compliant with the ITU-G703 specification, and which is stable and compliant over a wide range of load impedance values and associated capacitive milieus.

An embodiment of the present invention, a universal cable driver buffer, is thus described. While the present invention has been described in particular embodiments, it should be appreciated that the present invention should not be

What is claimed is:

1. An apparatus for driving a signal on a cable without sensitivity to parasitic capacitance and variation in load impedance, said apparatus comprising:
   a first amplifier having a first input forming an input of said apparatus, and a first amplifier output coupled through a second amplifier to a voltage divider, said voltage divider dividing said constant signal amplitude and having a node with a node voltage, said node voltage equal to one half of said constant signal amplitude;
   a third amplifier having a second input coupled to said node, and a third input, said third input receiving a reference voltage equal to one half of said constant signal amplitude, said third amplifier comparing said reference voltage and said node voltage and generating a corresponding third amplifier output; and
   a current mirror coupled to said third amplifier for receiving said third amplifier output and driving an output of said apparatus according to said third amplifier output.

2. The apparatus as recited in claim 1, wherein said first amplifier, said second amplifier, said third amplifier, and said current mirror are implemented with components comprising complementary metal oxide semiconductor transistors.

3. The apparatus as recited in claim 1, wherein said first amplifier comprises a first differential amplifier, and wherein said second amplifier comprises a low output impedance source follower.

4. The apparatus as recited in claim 3, wherein said first differential amplifier and low output impedance source follower comprise N-channel complementary metal oxide semiconductor transistors.

5. The apparatus as recited in claim 1, wherein said third amplifier comprises a differential amplifier.

6. The apparatus as recited in claim 5, wherein said differential amplifier comprises a first stage and a second stage.

7. The apparatus as recited in claim 6, wherein said first stage comprises N-channel complementary metal oxide semiconductor transistors.

8. The apparatus as recited in claim 6, wherein said second stage comprises P-channel complementary metal oxide semiconductor transistors.

9. The apparatus as recited in claim 1, wherein said current mirror comprises P-channel complementary metal oxide semiconductor transistors.

10. A universal cable driver buffer circuit that supplies a signal without sensitivity to parasitic capacitance and variation in load impedance, said universal cable driver buffer circuit comprising:
    a first amplifier having a first input forming an input of said universal cable driver buffer circuit, and a first amplifier output coupled through a second amplifier to a voltage divider, said voltage divider dividing said constant signal amplitude and having a node, said node having a node voltage equal to one half of said constant signal amplitude;
    a third amplifier having a second input coupled to said node, and a third input, said third input receiving a reference voltage equal to one half of said constant signal amplitude, said third amplifier comparing said reference voltage and said node voltage and generating a corresponding second amplifier output; and
    a current mirror coupled to said third amplifier for receiving said second amplifier output and driving an output of said universal cable driver buffer circuit accordingly;
    wherein said universal cable driver buffer circuit does not incorporate operational amplifiers.

11. The universal cable driver buffer circuit as recited in claim 10, wherein said first amplifier, said second amplifier, said third amplifier, and said current mirror are implemented with components comprising complementary metal oxide semiconductor transistors.

12. The universal cable driver buffer circuit as recited in claim 10, wherein said first amplifier comprises a differential amplifier, and wherein said second amplifier comprises a low output impedance source follower.

13. The universal cable driver buffer circuit as recited in claim 12, wherein said first amplifier and said second amplifier comprise N-channel complementary metal oxide semiconductor transistors.

14. The universal cable driver buffer circuit as recited in claim 10, wherein said third amplifier comprises a differential amplifier.

15. The universal cable driver buffer circuit as recited in claim 14, wherein said differential amplifier comprises a first stage and a second stage.

16. The universal cable driver buffer circuit as recited in claim 15, wherein said first stage comprises N-channel complementary metal oxide semiconductor transistors.

17. The apparatus as recited in claim 15, wherein said second stage comprises P-channel complementary metal oxide semiconductor transistors.

18. The apparatus as recited in claim 10, wherein said current mirror comprises P-channel complementary metal oxide semiconductor transistors.

* * * * *